March 28, 1933. A. HOCHFELD 1,902,954
SMALL VARIABLE POTENTIAL ELECTRIC MOTOR
Filed Jan. 30, 1930  2 Sheets-Sheet 1
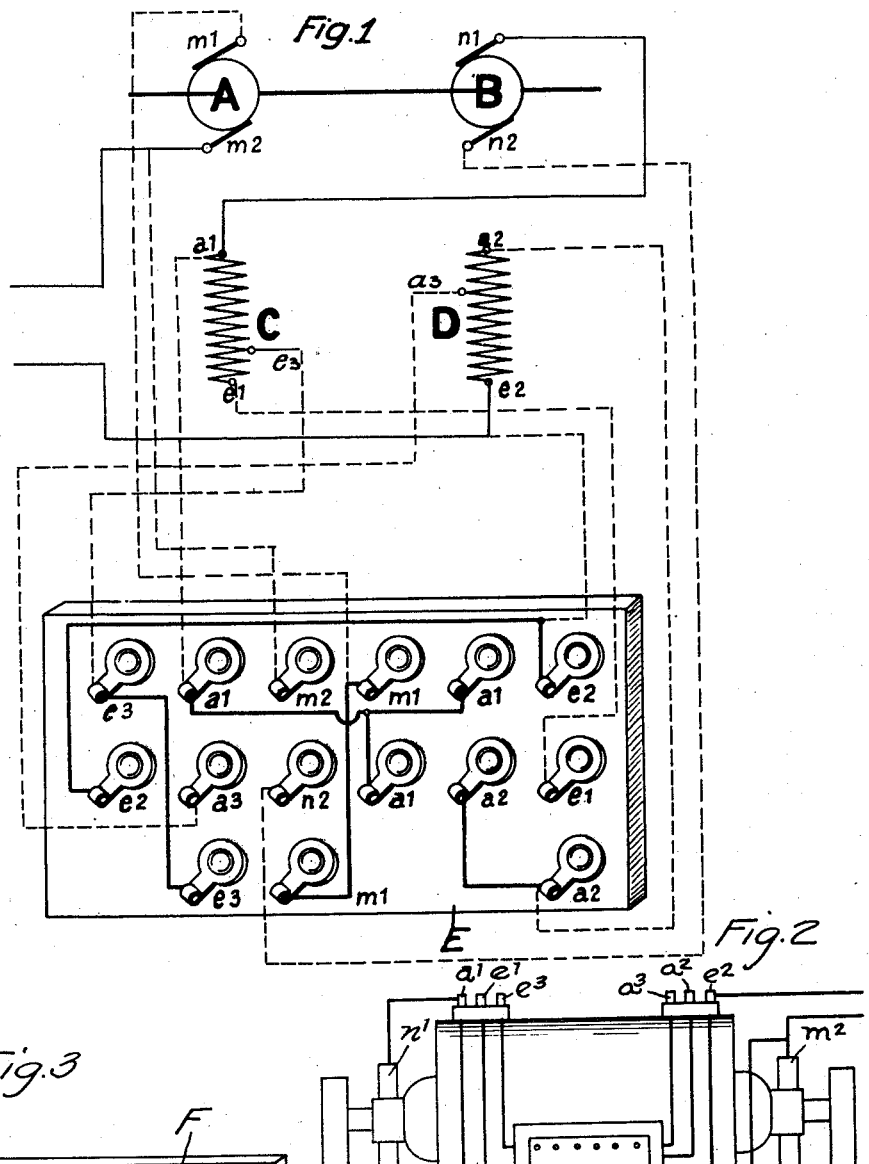
Inventor
Arno Hochfeld
by Lotka & Kellenback
Attorneys.

March 28, 1933.   A. HOCHFELD   1,902,954
SMALL VARIABLE POTENTIAL ELECTRIC MOTOR
Filed Jan. 30, 1930   2 Sheets-Sheet 2
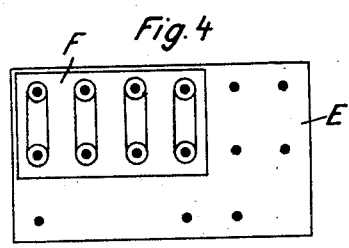
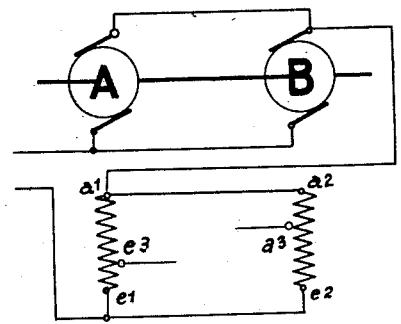
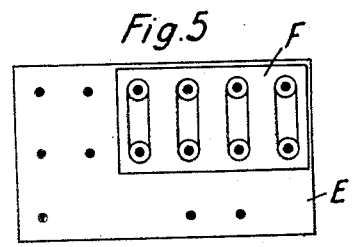
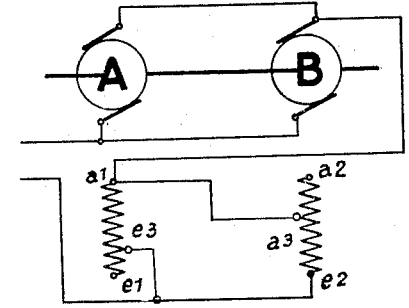
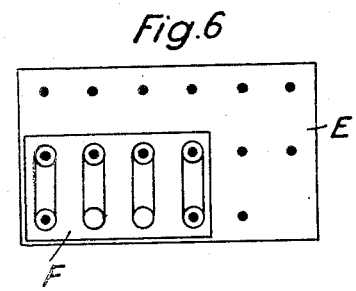
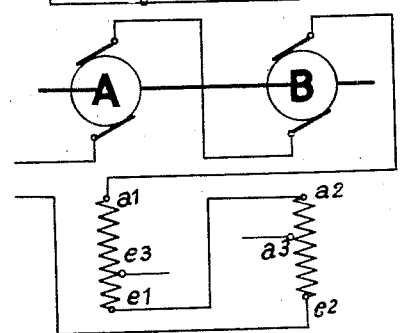
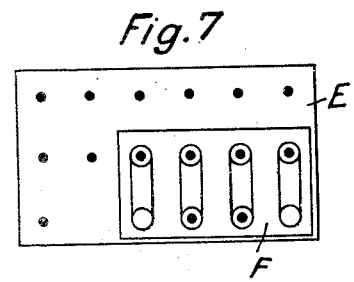
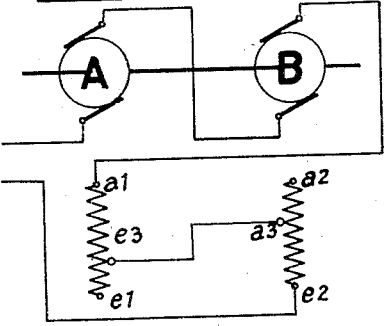
Inventor
Arno Hochfeld
by Lotka & Kehlenbeck
Attorneys.

Patented Mar. 28, 1933

1,902,954

UNITED STATES PATENT OFFICE

ARNO HOCHFELD, OF BERLIN, GERMANY, ASSIGNOR TO DEUTSCHE TELEPHONWERKE UND KABELINDUSTRIE AKTIENGESELLSCHAFT, OF BERLIN, GERMANY, A CORPORATION

SMALL VARIABLE POTENTIAL ELECTRIC MOTOR

Application filed January 30, 1930, Serial No. 424,543, and in Germany July 9, 1929.

The problem of constructing a small electric motor such as is used for example for driving gramophones, television apparatus, calculating machines and so forth, so that it may be connected to supplies of different voltage, was first solved by designing the motor for the lowest voltage and inserting a resistance in series for higher voltages. This method has various disadvantages; the resistance increases the cost of the apparatus and causes a contant loss of energy making the efficiency low; moreover the motor run irregularly because the resistance changes as it heats up and the fall of potential in the resistance varies; the resistance occupies some space, and it not unfrequently burns out and puts the motor out of action. Later, to obviate some of these disadvantages, motors were built with field windings that could be connected in parallel on a D. C. supply and in series on an A. C. supply.

The present invention is a small motor of the latter kind which can be readily adapted to various supply voltages without the aid of series resistance. In place of the usual armature the motor is equipped with two separate armatures or two separate armature windings both in the same field but each having its own commutator, and these are joined in series on the higher voltage ranges and in parallel for lower voltages. By this means, with a comparatively small number of variable connections the motor can be adapted for many different supplies; for example with only three variable connections on each half of the field winding and two variable connections to each armature, i. e., ten variable connections in all, the motor can be adapted to four different D. C. voltages and to four different A. C. voltages, the output, speed, torque, current consumption, efficiency and power factor (on A. C. supplies) remaining practically constant, irrespective of the frequency in the case of A. C. supply, while the copper and active iron of the motor are always fully utilized so that the motor does not have to be made of excessive size.

The requisite changes of connections can be made by any suitable switching apparatus. In lieu of using switches, connections from the motor may be brought to a terminal board or contact board between which the necessary junctions for a particular supply are made by soldered jumpers in accordance with a diagram or other instructions, or interchangeable junctions such as wire jumpers, plugs or clips may be employed which can be shifted in position as required. To prevent confusion it is desirable to have separate instructions for each arrangement of the motor, or to employ a single connector to make the requisite connections, there being, therefore, as many sets of instructions or connectors as there are different arrangements of the motor. A better method, which is a further development of the invention is so to arrange the terminals or contacts on the board, duplicating them where necessary or providing blank terminals or contacts, that a single connector or scheme of connections serves for all cases, being merely applied to different parts of the field of terminals or contacts for different cases. The motor is therefore changed from one arrangement to another merely by shifting the connector or the scheme of connections as a whole to a different part of the terminal or contact board. This makes it easy for unskilled persons to adapt the motor to their particular requirement without risk. Moreover since there is but one connector which is always in use there is no danger that when a change of connections is necessary on account of a change in the supply, shifting of the motor, or other causes, it will be impossible to carry it out because the appropriate connector has been lost or damaged.

The invention is diagrammatically illustrated in the accompanying drawings. Figure 1 shows the motor and the connections to the terminal board; Fig. 2 illustrates diagrammatically the mechanical structure of the motor and Figure 3 the connector by means of which the connections necessary in the several cases are made. Figure 4 shows the position of the connector on the terminal board and the connections of the motor for 110 volts D. C., and 160 A. C. Figure 5 shows the position of the connector on the terminal board and the connections of the motor for 75 volts D. C., and 110 volts A. C.

Figure 6 shows the position of the connector on the terminal board and the connections of the motor for 220 volts D. C., and 320 volts A. C. Figure 7 shows the position of the connector on the terminal board and the connections of the motor for 150 volts D. C., and 220 volts A. C.

In Figure 1 A, B indicate the two armature windings, represented as usual by their commutators. Each is constructed in the manner usual for small machines, and the two windings may be on the same or on separate armatures. There are two brushes $m_1$ $m_2$ and $n_1$ $n_2$ respectively on each commutator. One brush of one commutator (for instance, the brush $m_2$) is permanently connected to one terminal of the supply, one brush of the other commutator (as, the brush $n_1$) to one terminal ($a_1$) of one of the field windings C, D, and one terminal ($e_2$) of the other field winding (D) to the other terminal of the supply. Besides having terminals at their ends these field windings have tappings, say one tapping each near one end; that is, these intermediate taps $a_3$ and $e_3$ are not at the midpoints of the respective field windings, but subdivide such windings into unequal portions, preferably in the reverse manner shown, that is, the portion $a_2$ $a_3$ of the coil D corresponds to the portion $e_1$ $e_3$ of the other field coil C. With reference to the permanently connected ends $a_1$ and $e_2$ of the field windings C and D respectively, the unequal portions of the two windings are of like arrangement, that is, the larger portion ($a_1$ $e_3$ and $e_2$ $a_3$) of each winding is at such permanently connected ends. Six connections brought to the contact board E shown in Figure 1 from the remaining two terminals of the armature windings and the remaining four terminals of the field windings, enable the motor to be adapted for any one of eight different supplies. It can be adapted for still more by the provision of additional tappings.

In the case illustrated the contact board E of Figure 1 contains fifteen plugs which are connected among themselves as shown by five jumpers on the back of the board, and also to those terminals of the motor whose reference letters they respectively bear.

Figure 3 shows a connector F in which are eight sockets connected together in pairs, and spaced to register with a corresponding number of the plugs of the contact board, upon which the connector may be placed in various positions. Its several positions and the motor connections resulting from them are shown in Figures 4 to 7. It will be seen that in the low voltage connections of Figures 4 and 5 the two armature windings are in parallel with each other and so are the two field windings; while in the high voltage connections of Figures 6 and 7 they are in series. An intermediate arrangement is obtained both in the parallel and in the series connection by using a part only of the field windings as appears in Figures 5 and 7. The duplication of five contacts on the terminal board E and the use of some blank spaces enables all the connections described to be obtained with a contact board E little more than twice the size of the connector F; without these provisions it would need to be four times as big as the connector and to contain forty plugs. It will be noted that the motor windings have ten terminals ($a_1$ $a_2$ $a_3$ $e_1$ $e_2$ $e_3$ $m_1$ $m_2$ $n_1$ $n_2$) and that the contact board E has fifteen contacts (plugs) connected with said terminals, the number of such contacts therefore being greater than the number of terminals. The connector contacts or sockets of the same pair are connected by jumpers, as shown in Fig. 3, the connector F having four such jumpers.

What I claim is:—

1. A small variable potential electric motor, comprising a field structure and an armature structure, windings thereon, a terminal board with contact devices thereon connected to said field and armature windings, said contact devices being so arranged that a set of jumpers of given relative position applied to said terminal board will connect the motor windings for one voltage or another according to the position in which such set of jumpers is placed upon the board, and a connector embodying jumpers in said given relative position adapted to be placed in different positions on the terminal board and to cooperate with the contact devices thereon to establish different connections in each different position.

2. An electric motor comprising two armature windings, two field windings, two current-supply connections one of which leads to one end of one of the field windings and the other to one end of one of the armature windings, a connection from one end of the other field winding to one end of the other armature winding, and means for variably connecting the field windings and the other ends of said armature windings.

3. An electric motor comprising two armature windings, two field windings, each associated with one of said armature windings, two current-supply connections one of which leads to one end of one of the field windings and the other to one end of the armature winding associated with the other field winding, a connection from one end of such other field winding to one end of the other armature winding, and means for variably connecting the field windings and the other ends of said armature windings.

4. An electric motor comprising two armature windings, two field windings, two current-supply connections one of which leads to one end of one of the field windings and the other to one end of one of the armature windings, a connection from one end of the other field winding to one end of the other armature winding, taps located on said field windings and dividing them into unequal portions, and means for variably connecting the field windings and the other ends of said armature windings as well as said taps.

5. An electric motor comprising two armature windings, two field windings, two current-supply connections one of which leads to one end of one of the field windings and the other to one end of one of the armature windings, a connection from one end of the other field winding to one end of the other armature winding, taps located on said field windings and dividing them in like proportion into unequal portions of like arrangement with reference to said connected ends of said field windings, and means for variably connecting the field windings and the other ends of said armature windings as well as said taps.

6. An electric motor comprising armature and field windings provided with terminals, a set of contacts connected with said terminals, the number of said contacts being greater than the number of said terminals, and sundry of said terminals being connected with more than one of said contacts, and a connector adapted to register with said set in different positions and having contacts adapted to co-operate with those of the set to establish different connections between the motor windings in each different position of said connector.

7. An electric motor comprising armature and field windings provided with terminals, a stationary set of contacts connected with said terminals, the number of such contacts being greater than the number of said terminals, and sundry of said terminals being connected with more than one of said contacts, and a movable connector adapted to be placed in different positions relatively to said stationary set of contacts and having contacts adapted to co-operate with those of said set to establish different connections between the motor windings in each different position of said connector.

8. An electric motor comprising armature and field windings provided with terminals, a stationary contact board having blank spaces and a set of contacts connected with said terminals, the number of such contacts being greater than the number of said terminals, and sundry of said terminals being connected with more than one of said contacts, and a movable connector adapted to be placed in different positions relatively to said stationary set of contacts and having contacts adapted to register with said blank spaces or with the contacts of said board to establish different connections between the motor windings in each different position of said connector.

9. An electric motor comprising divided armature and field windings, a set of contacts connected with said windings, and a movable connector adapted to be placed in different positions relatively to said set of contacts and provided with contacts adapted to co-operate with said set of contacts to establish different connections between said motor windings in each different position of the connector while maintaining the same motor speed and output in each of said different positions.

10. An electric motor comprising divided armature and field windings, a stationary rectangular board having a set of contacts connected with said windings, and a movable rectangular connector, smaller than said board, and adapted to be placed in any of the corners of said board, said connector having a smaller number of contacts than said board, co-operating with the board contacts to establish different connections between the motor windings in each different position of the connector.

11. An electric motor comprising divided armature and field windings, a stationary polygonal board having a set of contacts connected with said windings, and a movable connector of polygonal shape similar to that of the said board, but smaller, and adapted to be placed in any of the corners of said board, said connector having a smaller number of contacts than said board, co-operating with the board contacts to establish different connections between the motor windings in each different position of the connector.

12. A small constant speed and load electric motor suitable for operation on direct and alternating current at different voltages, comprising a motor casing, two undivided armature windings connected to rotate in unison, two commutators, one for each of said armature windings, a pair of brushes for each of said commutators, a magnetic field common to both of said armature windings, a field-coil system, and a contact board located on said motor casing and provided with terminals adapted to form different groups, each group serving for one voltage and current character, the said terminals being connected permanently only with the four commutator brushes and through them with the two armature windings, and also with points of the said field-coils, and being adapted to connect in every case all of the armature coils and field-coils in various groups without the help of auxiliary resistances and in an economical way, with regard to the magnetic and electric characteristics of the motor.

13. A small constant speed and load electric motor suitable for operation on direct and alternating current at different voltages, comprising a motor casing, two undivided armature windings connected to rotate in unison, two commutators, one for each of said armature windings, a pair of brushes for each of said commutators, a magnetic field common to both of said armature windings, a field-coil system, a contact board located on said motor casing and provided with terminals adapted to form different groups, each group serving for one voltage and current character, the said terminals being connected permanently only with the four commutator brushes and through them with the two armature windings, and also with the ends and one intermediate point of each of said field-coils, and a connector adapted to be applied selectively to different parts of said contact board and provided with terminals which according to the position of said connector will establish connections of the several windings in different ways through the terminals of said contact board, to bring one or the other of the groups of terminals of the contact board into action.

In testimony whereof I have signed my name to this specification.

ARNO HOCHFELD.